United States Patent [19]

Shimanuki

[11] Patent Number: 5,073,928
[45] Date of Patent: Dec. 17, 1991

[54] CORDLESS TELEPHONE SYSTEM HAVING AN AUTOMATIC ANSWERING DEVICE

[75] Inventor: Masanobu Shimanuki, Yokohama, Japan

[73] Assignee: Kabushiki Kaisha Toshiba, Kawasaki, Japan

[21] Appl. No.: 508,608

[22] Filed: Apr. 13, 1990

[30] Foreign Application Priority Data

Apr. 18, 1989 [JP] Japan .................................. 1-98464

[51] Int. Cl.$^5$ ..................... H04M 1/64; H04M 11/00
[52] U.S. Cl. .......................................... 379/70; 379/61
[58] Field of Search ........................ 379/56, 61, 70, 58

[56] References Cited

U.S. PATENT DOCUMENTS

| | | | |
|---|---|---|---|
| 4,511,761 | 4/1985 | Yamazaki et al. | 379/61 |
| 4,677,655 | 6/1987 | Hashimoto | 379/61 |
| 4,875,229 | 10/1989 | Palett et al. | 379/58 |
| 4,881,259 | 11/1989 | Scordato | 379/56 X |

Primary Examiner—David Trafton
Attorney, Agent, or Firm—Foley & Lardner

[57] ABSTRACT

A cordless telephone system comprising a master set, a slave set, and a charger includes terminals for connecting the slave set and the charger so that communication of speech signals and control signals can be conducted. The charger includes an automatic answering circuit incorporated therein. When the automatic answering circuit receives a control signal indicative of a cell incoming through the terminals from the slave set, this circuit executes an automatic answering service such as a service to reproduce an answering message to transmit the reproduced answering message to the slave set through the terminals thereafter to record a message from a person on the other side of the line transmitted from the slave set through the terminals.

6 Claims, 5 Drawing Sheets

CORDLESS TELEPHONE SYSTEM HAVING AN AUTOMATIC ANSWERING DEVICE

BACKGROUND OF THE INVENTION

This invention relates to a cordless telephone system having an automatic answering function.

Cordless telephone systems are generally composed of a master telephone set fixedly arranged to an office line, a portable and mobile slave telephone set, and a mobile charger connected to a commercial power supply to charge the battery of the slave telephone set.

Where there is conventionally a need of using in common the cordless telephone set and the automatic answering telephone set, user must connect these two telephone sets in parallel with the telephone line and use them.

In view of this, it is demanded to allow the cordless telephone set to have an automatic answering function. To realize this, it is devised to assemble an automatic answering circuit into the slave or master telephone set of the cordless telephone set. However, where the automatic answering circuit is assembled into the slave telephone set, it is impossible to keep the automatic answering standby state for a long time when dissipation of the battery is taken into account. Further, it is ordinary from a viewpoint of improvement in portability that the slave telephone set of the hand set unitary type. When a telephone of such a structure is employed, however, it is difficult to ensure the space of the speaker for reproduction or playback of message. On the other hand, where the automatic answering circuit is assembled into the master telephone set, since the contents of control signals intercommunicating between master and slave telephone sets vary in dependency upon whether the system is in a mode operating as an ordinary telephone set at the time of call incoming (ordinary mode) or in a mode operating at that time as an automatic answering telephone set (automatic answering mode), means for controlling this is further required, resulting in complicated structure and increased cost. In addition, since operations such as recording/reproduction of a message, etc. must be basically conducted by the master telephone set fixedly arranged, the merit of the cordless telephone that the slave set is mobile cannot be exhibited.

SUMMARY OF THE INVENTION

An object of this invention is to provide a cordless telephone system having an automatic answering function, which is constructed so that the operation in the automatic answering mode can be conducted on the slave set side, thereby making it possible to ensure the merit of the cordless telephone system that the slave set is mobile, which can ensure a long time automatic answering standby operation, and which has no necessity of changing the contents intercommunicating between the master and slave sets depending upon whether the system is in an ordinary mode or in an automatic answering mode.

This invention provides a cordless telephone system comprising: a master set connected to a telephone line; a mobile slave set including a battery as a power supply, for carrying out a radio communication of speech signals and control signals with said master set to thereby conduct a communication with said telephone line; a mobile charger adapted to be connected to said slave set when said slave set is attached to charge said battery; coupling means for coupling said slave set and said charger so that communication of said speech signal and said control signal can be conducted therebetween; automatic answering means provided in said charger to respond to a control signal indicative of a cell incoming from said slave set to carry out a communication with said slave set through said coupling means to thereby execute an automatic answering service determined in advance.

In accordance with the telephone system of this invention, intercommunication of speech signals and control signals can be conducted between the slave set and the charger. By this intercommunication, the charger can carry out a predetermined automatic answering service (e.g., reproduction of an answering message recorded in advance, or recording of a message from a person on the other end of the line, etc.). Accordingly, the slave set and the charger constitutes an automatic answering telephone system in a body. Further, since means for carrying out the automatic answering service is provided in the charger, a power for driving this means can be provided from a commercial power supply. Thus, a long time automatic answering standby operation can be ensured, and the automatic answering telephone system can be utilized in a mobile form.

DESCRIPTION OF THE PREFERRED EMBODIMENT

A preferred embodiment according to this invention will now be described with reference to the attached drawings.

Figure 1:
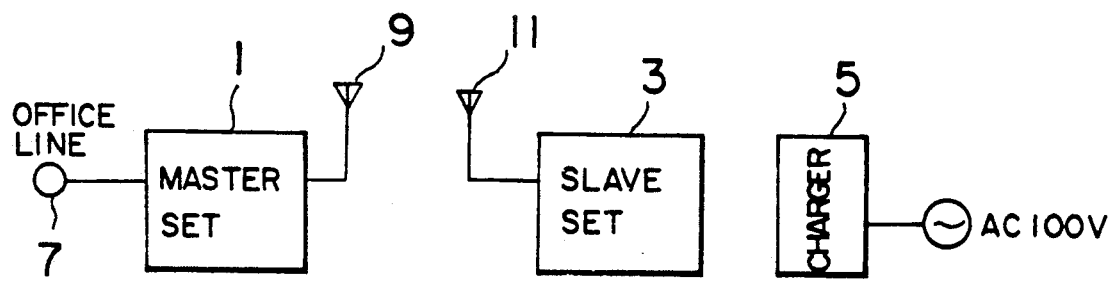
FIG. 1 is a block diagram showing an outline of the configuration of an embodiment of a cordless telephone system according to this invention.

Initially referring to FIG. 1, a cordless telephone system according to an embodiment of this invention is composed of a master set 1, a slave set 3, and a charger 5. The master set 1 is constructed in the same manner as in the prior art, and is connected to an office line 7 and is fixedly arranged. On the other hand, the slave set 3 is mobile to conduct a radio communication with the master set 1 through antennas 9 and 11, to transmit/-receive a speech to/from the office line 7.

Figure 2:
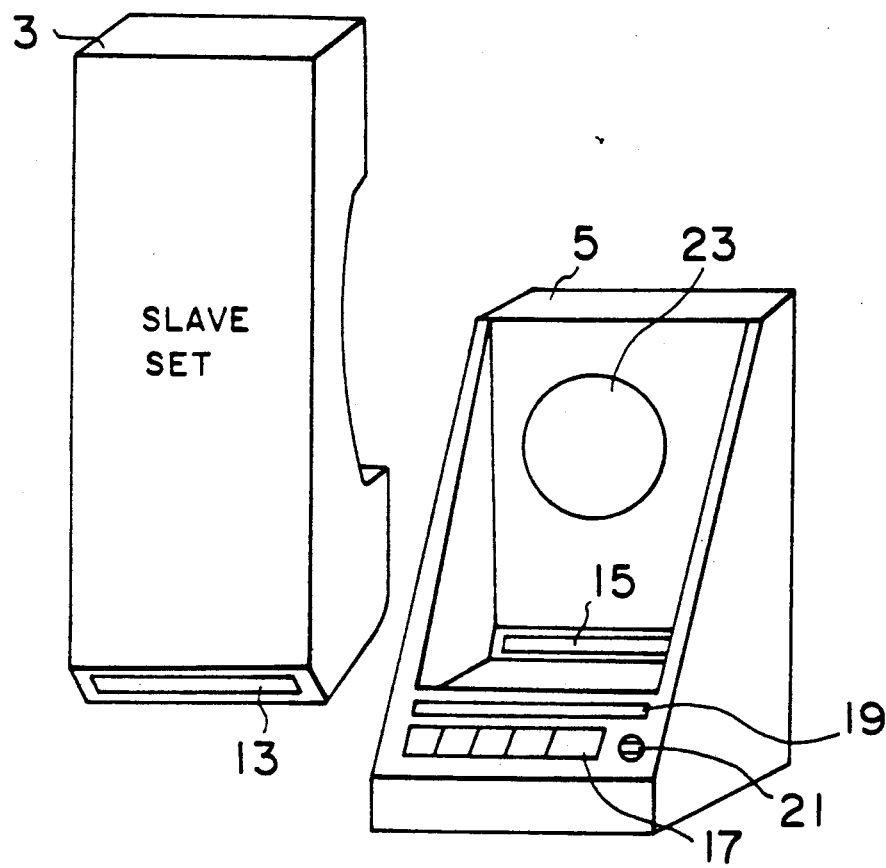
FIG. 2 is a perspective view showing the appearance of the slave set and the charger of the embodiment shown in FIG. 1.
Figure 3:
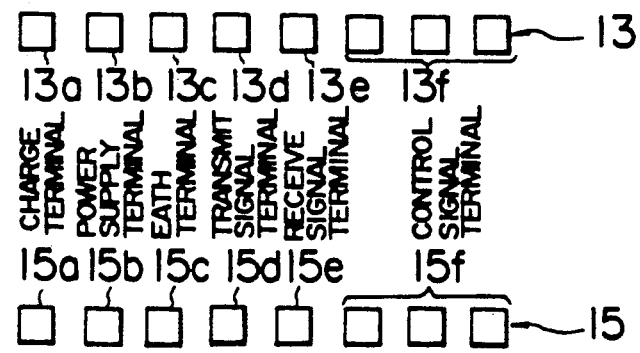
FIG. 3 is a plan view showing a terminal arrangement of the connection terminal section provided in the slave set and the charger of the embodiment shown in FIG. 1.

Referring to FIG. 2, the slave set 3 is of a hand set unitary structure, and includes a connection terminal section 13 at the lower end thereof. This connection terminal section 13 is composed of, as shown in FIG. 3, a charge terminal 13a, a power supply terminal 13b, a ground terminal 13c, a transmit signal terminal 13d, a receive signal terminal 13e, and a control terminal 13f.

The charger is also mobile in the same manner as in the slave set 3, and is activated when connected to a commercial power supply of AC 100 V at the place where it has been transferred. Referring again to FIG. 1, the charger 5 also serves as a stand for the slave set 3, and includes a connection terminal section 15 at the position in contact with the connection terminal section 13 of the slave set 3 when the slave set 3 is attached. Referring to FIG. 3, this connection terminal section 15 is composed of connection terminals 15a to 15f corresponding the connection terminals 13a to 13f on the slave set 3 side, respectively. The charger 5 receives a power from the commercial power supply AC 100 V. When the slave set is attached, the charger 5 delivers a charge power to a battery within the slave set 3 through charge terminals 15a, 13a and delivers a drive power to the slave set 3 through power supply terminals 13b, 15b. This charger 5 further includes therein a circuit coupled to the slave set 3 so that transmission/reception of speech and communication of control signals can be conducted through control signal terminals 15d to 15f, 13d to 13f and functioning as an automatic answering telephone set in a body with the slave set 3. At suitable positions on the external surface of this charger 5, there are provided an operating switch unit 17 comprised of various kinds of switches for operating the automatic answering telephone system, a display unit 19 for displaying the state of the telephone system, and a microphone 21 and a speaker 23 for recording/reproduction of messages.

Figure 4:
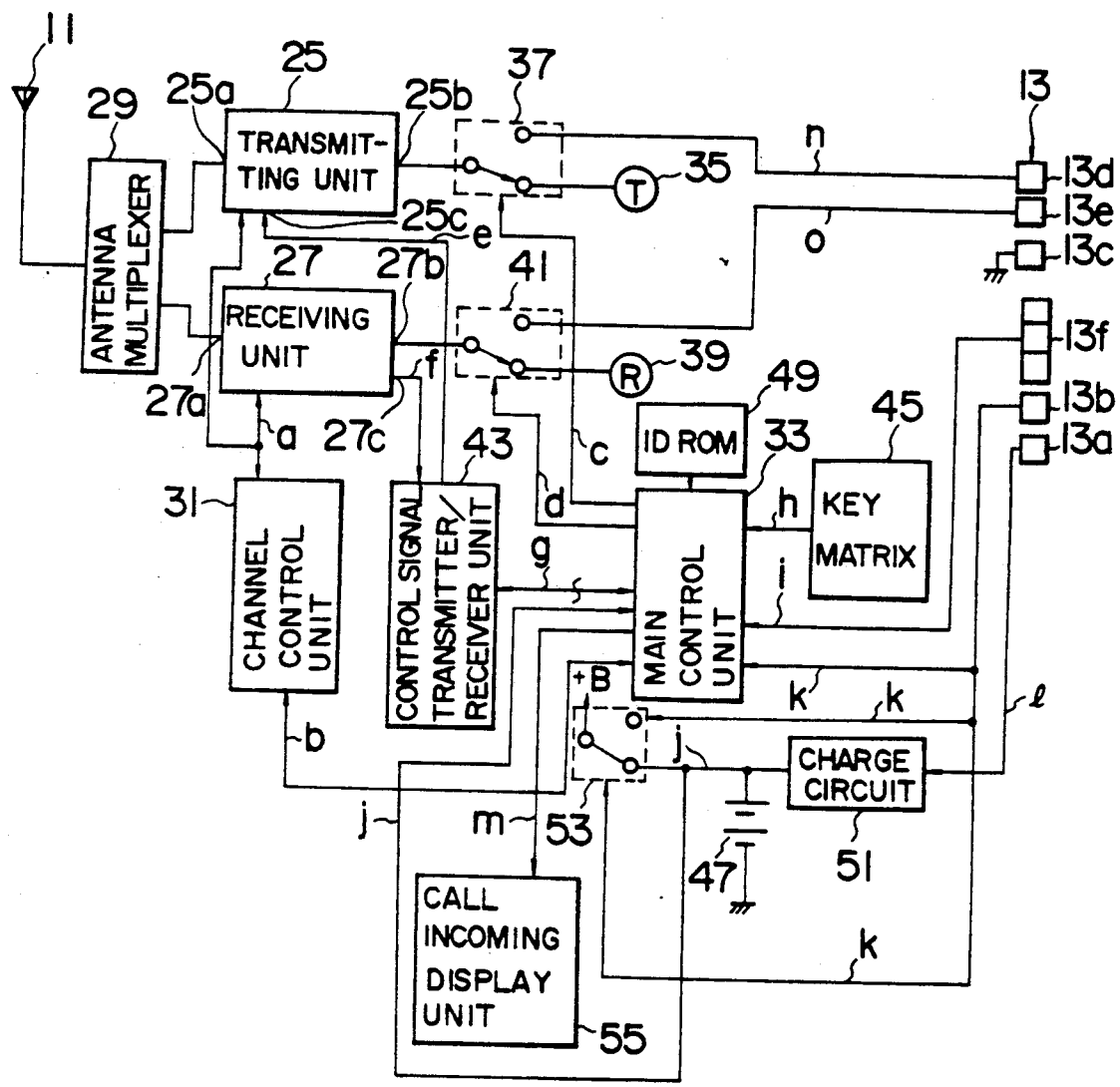
FIG. 4 is a block diagram showing the detailed configuration, of the slave set of the embodiment shown in FIG. 1.

FIG. 4 shows the internal configuration of the slave set 3. A transmitting unit 25 and a receiving unit 27 are provided in order to transmit/receive a control signal and a speech signal to/from the master set 1. The output terminal 25a of the transmitting unit 25 and the input terminal 27a of the receiving unit 27 are connected to a common antenna 11 through an antenna multiplexer 29. A channel control unit 31 is provided in order to control the transmitting unit 25 and the receiving unit 27. This channel control unit 31 senses an idle channel at all times to assign a speech channel and a control channel to the transmitting unit 25 and the receiving unit 27, and to effect a control of closing/opening of the speech channel in accordance with a control signal b from the main control unit 33.

The speech signal input terminal 25b of the transmitting unit 25 is connected to one of the transmitter 35 and the transmit signal terminal 13d selectively through the changeover switch 37. Further, the speech signal output terminal 27b of the receiving unit 27 is connected to one of the receiver set 39 and the receive signal terminal 13e selectively through the alternative switch 41. The alternative switches 37 and 41 are controlled by the main control unit 33. When the telephone set operates as an ordinary telephone set, i.e., in an ordinary mode, these switches 37 and 41 connect the transmitting unit 25 and the receiving unit 27 to the transmitter 35 and the receiver 39, respectively. On the other hand, when the telephone set operates as an automatic answering telephone set, i.e., in an automatic answering mode, they connect the transmitting unit 25 and the receiving unit 27 to the transmit signal terminal 13d and the receive signal terminal 13e, respectively.

The control signal transmitter/receiver unit 43 relays transmission and reception of a control signal between the main control unit 33 and the master set 1. Namely, on the basis of a control signal g delivered from the main control unit 33, this unit 43 transmits a control signal e corresponding to the control signal g to the master set 1 through the transmitting unit 25, and receives a control signal f from the master set through the receiving unit 27 to transmit a control signal corresponding thereto to the main control unit 33.

The main control unit 33 serves to synthetically control the operations of respective units in the slave set 3, and is comprised of, e.g., a microcomputer. The main control unit 33 is connected to a key matrix 45 to detect which key is depressed, thus to recognize input information from the key matrix 45. By such a key operation, key operations necessary for an ordinary telephone set including call originating are all made possible. In addition, when a predetermined code is key-inputted, the main control unit 33 is programmed so as to recognize it as a switching command of the automatic answering mode/ordinary mode.

The main control unit 33 is connected to a control signal terminal 13f. In the automatic answering mode, this unit 23 transmits and receives, to and from the charger 5, a control signal i necessary for control of the automatic answering telephone function through the terminal 13f. In this automatic answering mode, a control signal i sent from the charger 5 is transmitted from the main control unit 33 to the master set 1 through the control signal transmitter/receiver unit 43 and the transmitting unit 25. Further, a control signal sent from the master set 1 is inputted to the main control unit 33 through the receiving unit 25 and the control signal transmitter/receiver unit 43, and is then transmitted as a control signal i to the charger 5 through the terminal 13f.

In addition, the control unit 33 is connected to the call incoming display unit 55 comprised of, e.g., LED. When the control unit 33 receives, from the control signal transmitter/receiver unit 43, a signal to the effect that call incoming is made, it turns on and off the call incoming display unit 55. Further, the control unit 33 monitors an output voltage j of the battery 47 to transmit the monitor information to the charger 5 through the control signal terminal 13f. In addition, the control unit 33 is connected to the power supply terminal 13b to judge whether the slave set 3 is attached to the charger 5 in dependency upon presence and absence of a power supply voltage k of the charger 5 applied to the terminal 13b. Further, when a select command in the automatic answering mode is inputted from the key matrix 45 under the state where the slave set 3 is attached to the charger 5, the control unit 33 allows the changeover switches 37, 41 to be switched to the transmit terminal 13d side and the receive terminal 13e side, respectively, and transmits, to the charger 5 through the control signal terminal 13f, a control signal i to the effect that the automatic answering mode is set. The control unit 33 is also connected to an ID.ROM 49. In this ID.ROM 49, identification code of this telephone set is registered. The main control unit 33 avoids interference with other cordless telephone sets by using this identification code.

A charge circuit 51 is connected to the charge terminal 13a, and receives a supply of a charge voltage 1 from the charger 5 through the charge terminal 13a to charge the battery 47. A power supply changeover switch 53 is controlled by a power supply voltage k of the charger 5 delivered from the power supply terminal 13b, thus to select either the battery 47 or the charger power supply as a drive power supply +B for the slave set 3. Namely, when the slave set is attached to the charger, the power supply changeover switch 53 is switched to the power supply terminal 13b side to select a charger power supply, while when no slave set is attached to the charger, the power supply changeover switch 53 is switched to the charge terminal 13a to select the battery 47.

Figure 5:
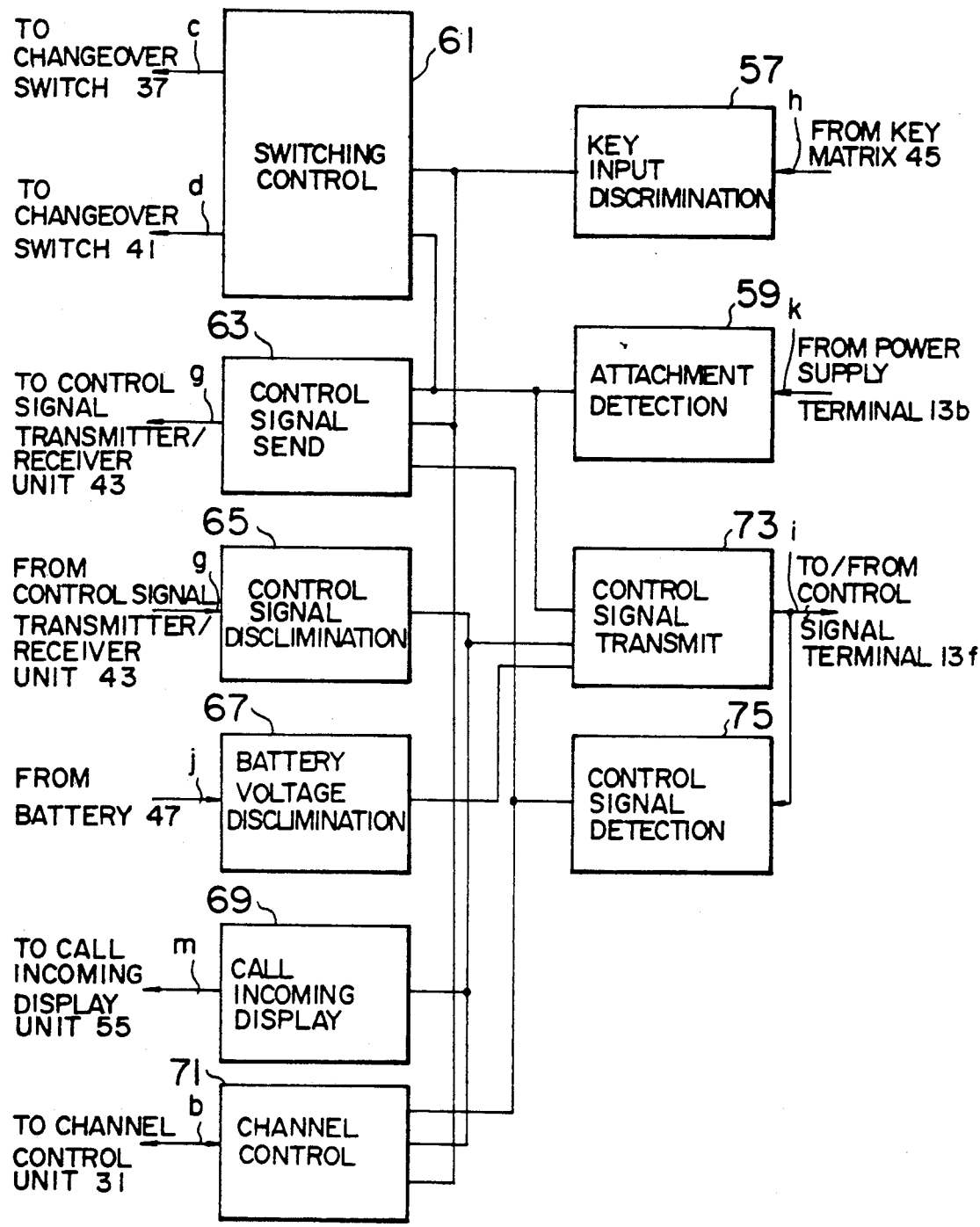
FIG. 5 is a block diagram showing the functions of the main control unit of the slave set shown in FIG. 4.

The function of the main control unit 33 will now be described with reference to FIG. 5. It is to be noted that where the main control unit 33 is comprised of a microcomputer, the functions of respective blocks in FIG. 5 are realized by software.

The key input discrimination block 57 detects a depressed key in the key matrix 45. Namely, this block 57 recognizes input information from the key matrix 45. Further, an attachment detection block 59 judges whether or not the slave set is attached to the charger depending upon presence or absence of an input voltage k from the power supply terminal 13b. A battery voltage discrimination block 67 recognizes an output voltage j of the battery 47.

A control signal discrimination block 65 receives a control signal g from the master set 1 through the control signal transmitter/receiver unit 43 to recognize the content thereof. A control signal detection block 75 recognizes the content of the control signal i from the charger 5 inputted through the control signal terminal 13f.

A changeover control block 61 controls the changeover switches 37 and 41 to switch connection of the transmitting unit 25 and the receiving unit 27. For example, in the ordinary mode, the transmitting unit 25 and the receiving unit 27 are connected to the transmitter 35 and the receiver 39, respectively. When attachment to the charger is detected and a key for selecting the automatic answering mode is depressed, the transmitting unit 25 and the receiving unit 27 are connected and switched to the transmit terminal 13d and the receive terminal 13e, respectively. Thereafter, when a key for selecting the ordinary mode is depressed, or when the slave set 3 is removed from the charger 5, the transmitting unit 25 and the receiving unit 27 are connected again to the transmitter 35 and the receiver 39, respectively.

A control signal sending block 63 sends, to the control transmitter/receiver unit 43, a control signal g to be transmitted to the master set 1. For example, in the ordinary mode, control signals related to call originating, call incoming/answering, end of speech, and charge, etc. are transmitted in accordance with the information from the key input discrimination block 57 or the attachment detection block 59. On the other hand, in the automatic answering mode, control signals related to the operation of the charger 5 are transmitted in accordance with information from a control signal detection block 75 in addition to the above-mentioned control signals.

A control signal transmission block 73 transmits a control signal i to the charger 5 through the control signal terminal 13f. For example, this block 73 transmits a control signal i related to call incoming or end of speech from a person on the other end of the line in accordance with information from the control signal discrimination block 67, and also transmits a control signal i indicative of a voltage of the battery 47 in accordance with information from the battery voltage discrimination block 67.

The call incoming display block 69 responds to call incoming information from the control signal discrimination block 67 to turn on and off the call incoming display unit 55.

A channel control block 71 controls the channel control unit 31. For instance, where there has been a call incoming, this block 71 operates depending upon respective modes as follows. In an ordinary mode, when it receives, from the key input discrimination block 57, information to the effect an answer to call incoming is made, or in an automatic answering mode, when it receives, from the control signal detection block 75, information to the effect that the charger 5 has made an automatic answering operation, it transmits a command b to the channel control unit 31 to close the speech channel of the transmission unit 15 and the receiving unit 27. Further, after the speech channel is closed, when it receives, from the control signal discrimination block 65, the key input discrimination block 57, or the control signal detection block 75, information to the effect that speech is completed, it opens the speech channel.

Figure 6:
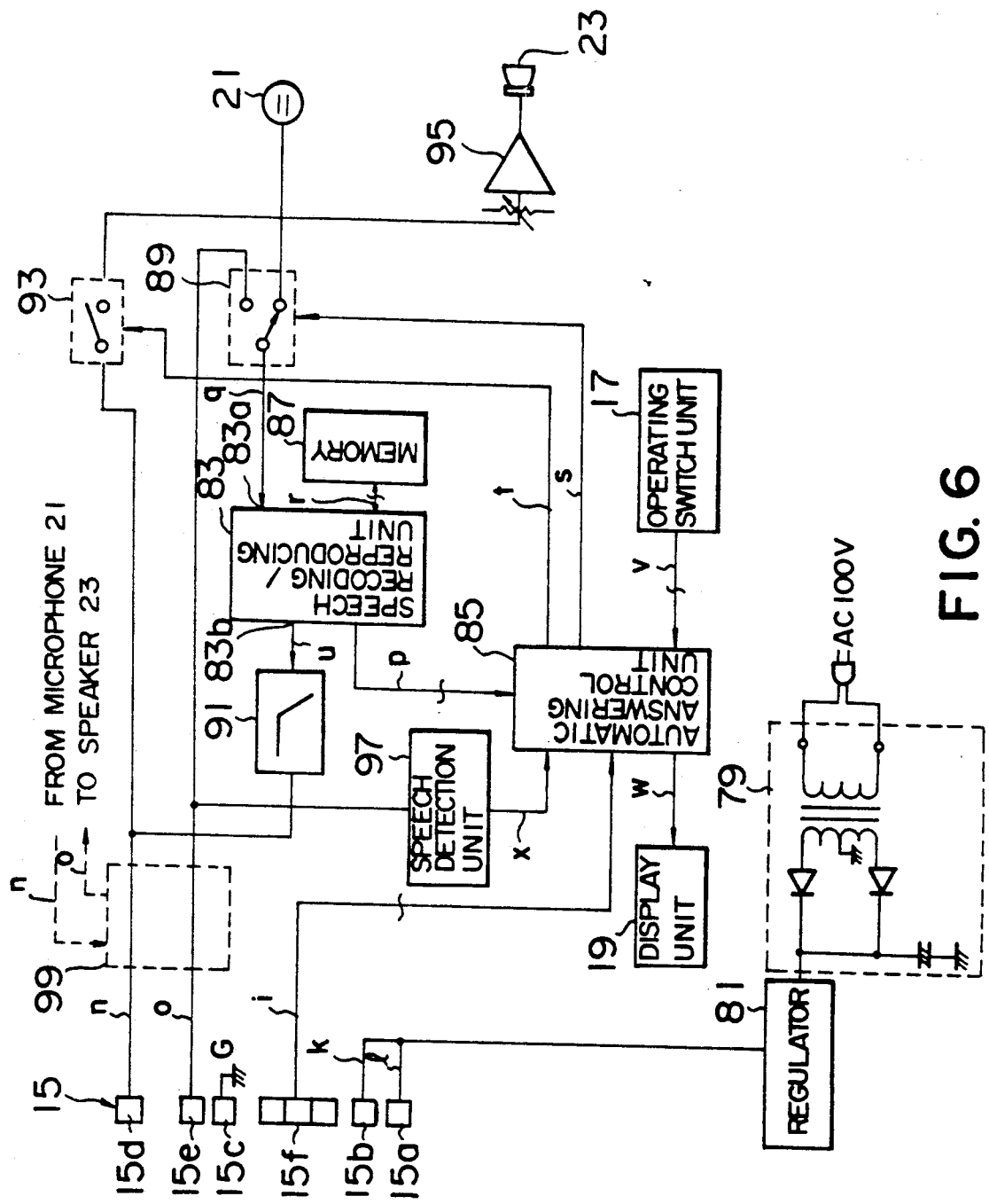
FIG. 6 is a block diagram showing the detailed configuration of the charger of the embodiment shown in FIG. 1.

The circuit configuration of the charger 5 will now be described with reference to FIG. 6. The output of a power supply circuit 79 connected to a commercial power supply AC 100 V is connected to the charge terminal 15a and the power supply terminal 15b through a regulator 81, thus to deliver a charge voltage and a power supply voltage k to the slave set 3.

A speech recording/reproducing unit 83 serves to record and reproduce a message in accordance with a control signal p from the automatic answering control unit 85. At the time of recording, this unit 83 inputs a speech signal q from the recording input terminal 83a to apply A/D conversion thereto to write a digital signal thus obtained into a designated area of the memory 87. At the time of reproduction, the unit 83 reads out recording data r from a designated area of the memory 87 to apply D/A conversion thereto to output, from the reproduced output terminal 83b, an analog signal thus obtained. The recording input terminal 83a of the speech recording/reproducing unit 83 is selectively connected to one of the microphone 21 and the receiver speech terminal 15e by means of the changeover switch 89. In this embodiment, the changeover switch 89 is driven by a control signal s from the automatic answering unit 85 to connect the recording input terminal 83a to the microphone 21 at the time of registration of the automatic answering message, and to connect it to the receive terminal 15e at the time of recording a message from a person on the other end of the line. Further, the reproduced output terminal 83b is connected to the transmit signal terminal 15d through a low-pass filter 1, and is also connected to the speaker 23 through a switch 93 and an amplifier 95. In this embodiment, the switch 93 is subjected to an on/off control by a signal t from the automatic answering control unit 89. Accordingly, a reproduced speech signal u is transmitted as a transmit signal n to the slave set 3, and is also outputted from the speaker 23 when the switch 93 is in an on state.

As understood from the above description, the automatic answering control unit 85 serves to control the section related to the automatic answering telephone function of the charger 5, and is comprised of, e.g., a microcomputer. This automatic answering control unit 85 is connected to the control signal terminal 15f, and transmits and receives a control signal i to and from the slave set 3 through the terminal 15f. As previously described, the control signal i transmitted from the slave set 3 includes a signal related to call incoming or end of speech, a signal related to a battery voltage of the slave set 3, and a signal related to setting/release of the automatic answering mode, etc. Further, the control signal i transmitted from the automatic answering control unit 85 to the slave set 3 includes a signal to the effect that answer to call incoming is made, or a signal to the effect that speech is completed. When the automatic answering control unit 85 receives set information in the automatic answering mode, and then receives call incoming information, it transmits, to the slave set 3, a signal i to the effect that an automatic answering has been made, and activates the speech recording/reproducing unit 83 to carry out a series of automatic answering services including transmission of an answer message and recording of a message from a person on the other end of the line, etc. Further, the automatic answering control unit 85 is connected to a speech detection unit 97. This speech detection unit 97 detects a multi-frequency (MF) signal from the receiver signal o to transmit a discriminated result to the automatic answering control unit 85. Where programming is made so as to provide a special service (e.g., sending a special message recorded in advance) to a specific person on the other end of the line, the automatic answering control unit 85 discriminates, from the output x from the speech detection unit 97 in the middle of execution of the automatic answering service, whether or not the person on the other end of the line is a specific person. As a result, if so, the automatic answering control unit 85 executes a special service.

When a command signal is inputted from the operating switch unit 17 under the state where the automatic answering control unit 85 is connected to the operating switch unit 17 and the automatic answering mode is released, the automatic answering control unit 85 controls the speech recording/reproducing unit 83, the changeover switch 89, and the switch 93 in accordance with the above inputting to perform such operations to register an input speech from the microphone 21 as an automatic answering message into the memory 87, or to reproduce a message from a person on the other end of the line to output it from the speaker 23, etc. This operation may be performed irrespective of whether or not the slave set 3 is attached.

The automatic answering control unit 85 is also connected to the display unit 19. When the slave set 3 is attached, this control unit 85 allows the display unit 19 to display a battery voltage of the slave set 3, while when the slave set 3 is detached, it allows the display unit 19 to display a time period during which the slave set 3 is detached.

Depending on the specification, a hand set free circuit 99 as indicated by broken lines may be added. This circuit 99 has a function to connect the transmitter speech terminal 15d and the receiver speech terminal 15e to the output terminal of the microphone 21 and the input terminal of the speaker amplifier 95, respectively, thereby permitting hand set free speech using microphone 21 and speaker 23.

The function of the automatic answering control unit 85 will now be described with reference to the functional diagram of FIG. 7. It is to be noted that when the automatic answering control unit 85 is constituted by a computer, respective functional blocks of FIG. 7 is principally realized by software.

Figure 7:
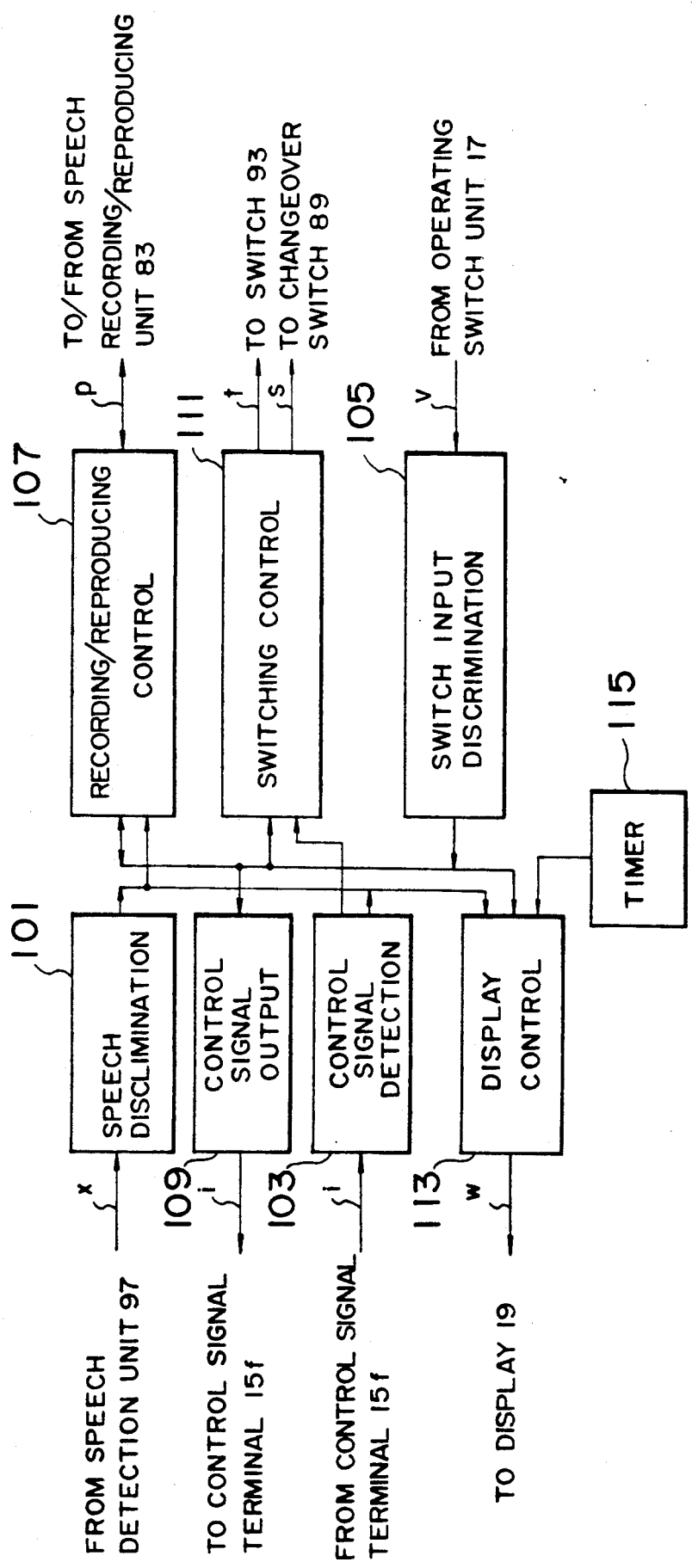
FIG. 7 is a block diagram showing the functions of the automatic answering control unit of the charger shown in FIG. 6.

As shown in FIG. 7, a speech discrimination block 101 serves to judge whether or not a person on the other end of the line is a specific person on the basis of an output x from the speech detection unit 97. A control signal detection block 103 serves to recognize a control signal i transmitted from the slave set 3 and a control signal output block 109 serves to send a control signal i to the slave set 3. Further, a switch input discrimination block 105 serves to recognize a command signal v from the operating switch unit 17.

In addition, a recording/reproducing control block 107 functions to control the speech recording/reproducing unit 83. When this block 107 receives call incoming information after it has received set formation of the automatic answering mode from the control signal detection block 103, this block 107 transmits, to the control signal output block 109, information to the effect that it makes an automatic answering operation, and activates the speech recording/reproducing unit 83 to allow the speech recording/reproducing unit 83 to execute a series of automatic answering services, e.g., to reproduce an answering message thereafter to record a message from a person on the other end of the line to stop the operation of the speech recording/reproducing unit when execution of such services is completed and to transmit, to the control signal output block 109, information to the effect that speech is completed. Further, when this block 107 receives, from the speech discrimination block 101, in the process of execution of the automatic answering service, information to the effect that a person on the other end of the line is a specific person, it instructs the speech recording/reproducing unit 83 to stop execution of service being carried out at present and to execute a special service such as reproduction of a specific message prepared in advance. Further, when this block 107 receives, from the control signal detection block 103, information to the effect that the slave set 3 is detached in the process of execution of the automatic answering service, it allows the speech recording/reproducing unit 83 to erase a message from a person on the other end of the line which has been recorded halfway, thereafter to stop the operation of the speech recording/reproducing unit 83. In addition, when information for instructing registration or reproduction of a message is outputted from the switch input discrimination block 105 in an ordinary mode, the recording/reproducing block 107 responds to this, allowing the speech recording/reproducing unit 83 to carry out the recording operation or the reproducing operation.

A switching control block 111 functions to control the switch 93 and the changeover switch 89. When this block 111 rerceives information in which the automatic answering mode is set from the control signal detection block 103, it controls the changeover switch 89 to connect the receive signal terminal 15e to the recording input terminal 83a and to open the switch 93. On the other hand, in an ordinary mode, when the switching control block 111 receives information for instructing registration of a message from the switch input discrimination block 105, it controls the changeover switch 89 to connect the microphone 21 to the recording input terminal 83a. Further, when this block 111 receives information for instructing reproduction of a message from the block 105, it closes the switch 93.

A display control block 113 serves to drive and control the display 19. This block 113 judges whether or not the slave set 3 is attached on the basis of battery voltage information from the control signal detection block 103, thus allowing the display 19 to display a battery voltage when the slave set 3 is attached, and allowing the display 19 to display a time period during which the slave set 3 is not attached on the basis of information from a time counting block 115 when the slave set is not attached.

The operation of this embodiment will now be described.

When the slave set 3 is not attached to the charger 5, and when the slave set 3 is attached, but no automatic answering mode is set, this telephone system is in an ordinary mode. In such an ordinary mode, the slave set 3 and the master set 5 function as an ordinary cordless telephone. At this time, the charger 5 displays, on the display unit 19, a time period during which the slave set 3 is detached if it is detached, and displays a battery voltage of the slave set 3 or a remaining speech permissible time based on the battery voltage when the slave set is attached. By this display, user can judge whether or not the slave set 3 is required to be charged, and how long the remaining speech permissible time is.

When a registration command of a message is inputted along with the designation of the memory area from the operating switch unit 17 of the charger 5 irrespective of attachment/detachment of the slave set in an ordinary mode, the microphone 21 and the recording input terminal 83a of the speech recording/reproducing unit 83 are connected. Thus, an input speech from the microphone 21 is registered into a designated area of the memory 87. Further, when a command for reproducing a message is inputted from the operating switch unit 17 along with the designation of a memory area, the speaker amplifier 95 and the reproduced output terminal 83b of the speech recording/reproducing unit 83 are connected. Thus, the message concerned is read out from the designated area of the memory 87 and is then outputted from the speaker 23. By utilizing the function of registrating/reproducing message, such a way to use may be adopted to register the place where a user has moved as a message in moving the slave set 3 detached from the charger 5 to inform another user who has come late of the place where the user has moved, in addition to the way to effect an ordinary use of an automatic answering telephone to register of the answering message and to reproduce a message from a person on the other end of the line.

Where the slave set 3 is attached to the charger 5, the slave set 3 recognizes attachment to the charger by voltage k from the charger 5, and the charger 5 recognizes attachment of the slave set by a control signal i indicative of a battery voltage transmitted from the slave set 3. Further, the changeover switch 53 of the slave set 3 is switched to the power supply terminal 13b side. Thus, the slave set 3 is driven by a power supplied from the charger 5. In this state, when a command for setting the automatic answering mode is inputted from the key matrix 45 of the slave set 3, in the slave set 3, the changeover switches 37 and 41 connect the transmit signal terminal 13d and the receive signal terminal 13e to the transmitting unit 25 and the receiving unit 27, respectively, and a control signal i to the effect that the automatic answering mode is set is transmitted to the charger 5. In the charger 5, the changeover switch 89 responds to the control signal i to connect the receive signal terminal 15e to the recording input terminal 83a and the switch 93 is opened. Thus, the slave set 3 and the charger 5 constitutes an automatic answering telephone system in a body (automatic answering mode), resulting in the call incoming standby state (automatic answering standby state).

When there is a call incoming in the automatic answering state, information indicative of call incoming is transmitted from the master set 1 by wireless and is thus received by the slave set 3. As a result, the call incoming display unit 55 of the slave set 3 is turned on and off, and a control signal i to the effect of call incoming is transmitted to the charger 5. When the charger 5 recognizes a call incoming, it sends a control signal to the effect that it makes an automatic answering operation back to the slave set 3 and activates the speech recording/reproducing unit 83. The slave set 3 recognizes that the charger 5 has made an automatic answering operation to close the speech channel of the transmitting unit 25 and the receiving unit 27. Thus, the speech path between the charger 5 and the master slave 1 is formed.

The speech recording/reproducing unit 83 of the charger 5 reproduces an answering message registered in advance. This message is transmitted wireless through the slave set 3 as a transmit signal and is then received by the master set 1. The message thus received is sent to a telephone set on the other end of the line through an office line. Subsequently, a speech signal sent through the office line from a person on the other end of the line is transmitted wireless from the master set 1 and is then received by the slave set 3. The speech signal thus received is sent to the charger 5 as a receive signal o. Where a MF signal is included in the receive signal o, the MF signal is recognized by the speech detection unit 97. On the basis of the result of recognition, whether or not a person on the other end of the line is a specific person is judged. Where that person is judged to be a specific person, the service being executed at present is stopped, and a special service such as sending of a special message prepared in advance is executed. In contrast, when no MF signal is transmitted, or when it is judged that a person on the other end of the line is not a specific person, the speech recording-/reproducing unit 83 is brought into a recording mode for a predetermined time after reproduction of the answering message is completed, thus to record a receive signal o from the person on the other end of the line as a message from the person on the other end of the line. When execution of the automatic answering service is thus completed, the charger 5 stops the operation of the speech recording/reproducing unit 83 and transmits, to the slave set 3, a control signal i to the effect that speech is completed. Thus, the slave set 3 recognizes the end of speech to open the speech channel of the transmitting unit 25 and the receiving unit 27. In this way, the slave set 3 and the charger 5 are brought into the automatic answering standby state for a second time.

When a person on the other end of the line carries out the speech end operation during execution of the automatic answering service, the information indicative of end of speech is transmitted from the master set 1 to the slave set 3, and is further transmitted from the slave set 3 to the charger 5. The charger 5 recognizes end of speech of a person on the other end of the line to stop the operation of the speech recording/reproducing unit 83 to send a control signal i to the effect that speech is completed back to the slave set 3. Thereafter, the slave set 3 and the charger 5 are again brought into the automatic answering standby state in the same manner as above.

When the slave set 3 is detached from the charger 5 during execution of the automatic answering service, the slave set 3 recognizes disconnection therebetween on the basis of the fact that an input of the power supply voltage from the charger 5 is lost, and the charger 5 recognizes disconnection therebetween on the basis of the fact that a battery voltage J from the slave set 3 is lost. In this case, in the slave set 3, the changeover switch 54 selects the battery 47 as a power supply, and the changeover switches 37 and 41 connect the transmitter 35 and the receiver 39 to the transmitter unit 25 and the receiver 27, respectively. Further, the charger 5 allows the speech recording/reproducing unit 83 to stop execution of the automatic answering service. If a message from a person on the other end of the line is being recorded, the charger 5 erases that message thereafter to stop the operation of the speech recording/reproducing unit 83. In this way, the slave set 3 and the charger 5 releases the automatic answering mode, and is brought into an ordinary mode for a second time. Thus, speech with a person on the other end of the line shifts from supply of the automatic answering service to an ordinary hand set speech.

In the automatic answering standby state, when an automatic answering mode release command is inputted from the key matrix 45 of the slave set 3, or when the slave set 3 is detached from the charger 5, the slave set 3 and the charger 5 recognize this to release the automatic answering mode to return to an ordinary mode. In this case, the slave set 3 is brought into an ordinary call incoming standby state.

In the charger 5 having a specification provided with a hand set free circuit 99, utilization of this circuit 99 makes it possible to monitor a speech transmitted from a person on the other end of the line during execution of the automatic answering service. A user listens to a speech from a person on the other end of the line. As a result, if the user considers a calling person to be a person necessary for answering, he may detach the slave set 3 to change to the hand set speech. In contrast, if he judges that there is no need of answering, he may allow the operation of the telephone set to remain in the automatic answering mode. This is convenient in the case where a user is desirous of pretending to be out against a calling from persons except for specific ones, or mischievous calling.

While the preferred embodiment according to this invention has been described as above, this invention is not limited to such an implementation. As a modified example, where a person on the other end of the line is judged to be a specific person by a MF signal from the person on the other end of the line in an automatic answering mode, there may be provided an optional service to automatically release the automatic answering mode to return the operational mode of the system to an ordinary mode in addition to a service to transmit a special message. This is convenient in the case where user wishes to answer only a telephone call from a specific person by hand set. Further, while the automatic answering mode is set by attaching the slave set 3 to the charger 5 thereafter to input a predetermined code from the key matrix in the above-described embodiment, the automatic answering mode may be automatically set in response to attachment of the charger.

In addition, there may be adopted an arrangement to effect a radio communication of speech signals and control signals between the slave set and the charger. In that case, even under the state where the slave set is not attached to the charger, it is possible to use this cordless telephone system as an automatic answering telephone system.

What is claimed is:

1. A cordless telephone system comprising:
   a master set connected to a telephone line;
   a mobile slave set including a battery as a power supply, for carrying out a radio communication of speech signals and control signals with said master set to thereby conduct a communication with said telephone line;
   a mobile charger adapted to be connected to said slave set when said slave set is attached to charge said battery;
   coupling means for coupling said slave set and said charger so that communication of said speech signal and said control signal can be conducted therebetween;
   automatic answering means provided in said charger to respond to a control signal indicative of a cell incoming from said slave set to carry out a communication with said slave set through said coupling means to thereby execute an automatic answering service determined in advance.

2. A cordless telephone system as set forth in claim 1, wherein said coupling means includes first connection means provided on said slave set, and second connection means provided on said charger and adapted to be connected to said first connection means when said slave set is attached to said charger, whereby when connection between said first and second connection means is established, said slave set and said automatic answering means are connected so that they can communicate with each other.

3. A cordless telephone system as set forth in claim 1, wherein said coupling means is adapted to conduct a radio communication of said speech signals and said control signals between said slave set and said charger.

4. A cordless telephone system as set forth in claim 2, wherein said slave set includes a transmitter, a receiver, receive signal switching means for selecting whether a speech signal rom said master set should be transmitted to either said receiver or said first connection means, transmit signal switching means for selecting whether a speech signal from said first connection means or a speech signal from said transmitter should be transmitted to said master set, means for detecting whether or not said slave set is attached to said charger, and switching control means for allowing said receive signal switching means and said transmit signal switching means to select said receiver and said transmitter at least when non-attachment state is detected.

5. A cordless telephone system as set forth in claim 1, wherein said automatic answering means includes speech recording/reproducing means for recording said speech signal and reproducing the recorded speech signal, and automatic control means responsive to a control signal indicative of a call incoming from said slave set to control said speech recording/reproducing means to first reproduce an answering message registered in advance to transmit the reproduced answering message to said slave set thereafter to record a message from a person on the other end of the line transmitted from said slave master.

6. A cordless telephone system as set forth in claim 1, wherein said charger includes means for detecting whether or not said slave set is attached, and display means for displaying information relates to the battery voltage when attachment state of said slave set is detected and for displaying a time period during which said slave set is not attached when non-attachment state of said slave set is detected.

* * * * *